United States Patent Office 3,655,740
Patented Apr. 11, 1972

3,655,740
METHOD FOR PRODUCING AMINO-NAPHTHALENE SULPHONIC ACIDS
Horst Nickel and Fritz Suckfüll, Leverkusen, Germany, assignors to Farbenfabriken Bayer Aktiengesellschaft, Leverkusen, Germany
No Drawing. Filed July 22, 1968, Ser. No. 746,251
Claims priority, application Germany, July 31, 1967, F 53,106
Int. Cl. C07c *143/64, 143/56*
U.S. Cl. 260—509  2 Claims

ABSTRACT OF THE DISCLOSURE

Compounds of the formula

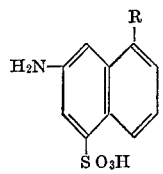

in which R is —OH or —$NH_2$ are prepared by nitrating 1-nitronaphthalene-5-sulfonic acid in oleum to give 1,7-dinitronaphthalene-5-sulfonic acid, reducing the latter to 1,7-diaminonaphthalene-5-sulfonic acid and optionally exchanging in known manner the 1-positioned amino group for a hydroxy group. These compounds are useful as intermediates in the preparation of azomethine dyestuffs, e.g. by condensation with aromatic aldehydes.

---

The object of the invention comprises new aminonaphthalene sulphonic acids of the formula

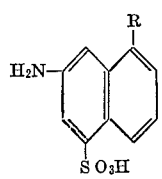

in this formula R stands for a group —OH or —$NH_2$.

The new aminonaphthalene sulphonic acids are obtained by nitrating 1-nitronaphthalene-5-sulphonic acid in oleum at low temperatures up to about room temperature, preferably at temperatures of about 0° C. to about 30° C., to give 1,7-dinitronaphthalene-5-sulphonic acid, subsequently reducing the latter to 1,7-diaminonaphthalene-5-sulphonic acid and optionally exchanging in the latter the 1-positioned amino group for a hydroxy group, for example, by reaction with alkali metal bisulphites.

For example, sulphuric acid with a content of 10 to 30% $SO_3$, especially about 20% $SO_3$, is used as oleum for nitrating the 1-nitronaphthalene-5-sulphonic acid. The individual nitration is carried out in such a manner that the 1-nitronaphthalene-5-sulphonic acid is dissolved in oleum and reacted at temperatures, preferably below room temperature, e.g. at 10° C., with a nitrating agent, such as alkali metal nitrates, particularly potassium nitrate. The reaction is completed in the course of some hours. The desired 1,7-dinitronaphthalene-5-sulphonic acid can be isolated from the reaction mixture in such a way, for example, that the reaction mixture is poured on to ice and the resultant solution mixed with an inorganic salt, e.g. with potassium chloride, the 1,7-nitro compound being selectively precipitated. Other nitration products which may be present in the reaction mixture remain in solution.

The reduction of 1,7-dinitronaphthalene-5-sulphonic acid to 1,7-diaminonaphthalene-5-sulphonic acid can be effected in conventional manner, e.g. with catalytically excited hydrogen or with iron/acetic acid, or zinc/hydrochloric acid, or with alkali metal sulphides, or with alkali metal sulphites.

From the resultant 1,7-diaminonaphthalene-5-sulphonic acid there may then be prepared in known manner the new 1-hydroxy-7-aminonaphthalene-5-sulphonic acid by a Bucherer reaction, i.ee by the reaction with alkali metal bisulphites, such as sodium bisulphite, at temperatures, for example, ranging from 90° C. to boiling temperature, followed by the customary working up by acidic elimination of $SO_2$ and alkaline adjustment of the reaction mixture. The 1-hydroxy-7-aminonaphthalene-5-sulphonic acid can be isolated from the reaction mixture by acidification and salting out, for example.

1,7-diaminonaphthalene-5-sulphonic acid and 1-hydroxy-7-aminonaphthalene-5-sulphonic acid are new products which are suitable for various purposes of application. They can be used as additives to lubricating substances and as intermediates for the synthesis of optical brighteners, plant protectants and azomethine dyestuffs. The latter are obtained by condensing aromatic aldehydes with aminonaphthalene sulphonic acid.

The process for the preparation of the new aminonaphthalene sulphonic acids described above proceeds in a surprising manner in so far as the nitration of 1-nitronaphthalene-5-sulphonic acid according to the previously known method, e.g. in sulphuric acid, preponderantly or exclusively leads to 1,8-dinitronaphthalene-5-sulphonic acid. It could not be expected that the nitration of 1-nitronaphthalene-5-sulphonic acid in oleum, particularly under the afore-mentioned conditions, would lead to the likewise unknown 1,7-dinitronaphthalene-5-sulphonic acid.

EXAMPLE 50.6 parts (0.2 mol) 1-nitronaphthalene-5-sulphonic acid are introduced at 10 to 15° C., with stirring and external cooling, into 400 parts by volume oleum (with a content of 20% $SO_3$). Into this solution 22 parts of finely powdered potassium nitrate are subsequently slowly strewn in at 10 to 12° C., with external cooling, and stirring is continued for 3 hours without further cooling, the temperature slowly rising to room temperature. The reaction mixture is then poured on to about 2000 parts of ice; temperature about 20° C. The resultant pale brown solution is mixed with about 10% of its volume potassium chloride and stirred overnight. The precipitated 1,7-dinitronaphthalene-5-sulphonic acid is filtered off with suction.

The paste obtained is introduced at 95 to 100° C. into a mixture of 70 parts iron chips, 500 parts by volume of water and 25 parts glacial acetic acid and stirred for about one hour. The mixture is subsequently rendered alkaline with about 170 parts of a 20% sodium carbonate solution and filtered off with suction from the iron slurry while hot. The filtrate contains the 1,7-diaminonaphthalene-5-sulphonic acid. By acidification with hydrochloric acid and mixing with sodium chloride, 1,7-diaminonaphthalene-5-sulphonic acid is separated in solid form and isolated.

The resultant sodium salt of 1,7-diaminonaphthalene-5-sulphonic acid is readily soluble in water and has a blue-green fluorescence under ultra violet irradiation.

In order to convert the 1,7-diaminonaphthalene-5-sulphonic acid into 1-hydroxy-7-aminonaphthalene-5-sulphonic acid, 0.1 mol of the acidic paste of the diamino compound is mixed by stirring with 200 parts by volume of a 40% sodium bisulphite solution and kept at 105 to 108° C. (for about 9 hours) until the diamino compound can no longer be detected. The mixture is subsequently rendered acid to congo at 50 to 80° C. with about 80 parts 30% hydrochloric acid and subsequently stirred until $SO_2$ can no longer be detected. A pH >10 is then adjusted with a 40% sodium hydroxide solution and the mixture kept at 90 to 100° C. for a further 30 minutes and then acidified with hydrochloric acid at 70° C. After stirring the mixture until cold, the precipitated 1-hydroxy-7-aminonaphthalene-5-sulphonic acid is filtered off with suction.

The Na salt of this acid is readily soluble in water and has a green fluorescence under ultra violet irradiation.

We claim:
1. Process for the preparation of compounds of the formula

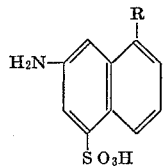

in which R is —OH or —$NH_2$; comprising the steps of
(a) nitrating 1-nitronaphthalene-5-sulfonic acid in oleum at temperatures of about 0–30° C.;
(b) subjecting the resulting 1,7-dinitronaphthalene-5-sulfonic acid to reduction to form 1,7-diamino-5-sulfonic acid; and where R is —OH the additional step (c) comprising reacting said 1,7-diaminonaphthalene-5-sulfonic acid with an alkali metal bisulfite at 90° C. to boiling temperature and rendering the mixture acid.

2. The process of claim 1 wherein the nitrating step (a) is carried out in 10–30% oleum.

References Cited

UNITED STATES PATENTS 2,748,107   5/1955   Hendrickson et al. ___ 260—144

FOREIGN PATENTS 82,676   2/1894   Germany _____ 260—509

OTHER REFERENCES

Beilstein, Handbuch der Organischen Chemie, Vierte Auflage, Tweites Ergantzungswerk General Formel Register, pp. 796, 797, 817, 818 (1956).

DANIEL D. HORWITZ, Primary Examiner

U.S. Cl. X.R.

260—510